United States Patent [19]
Miyashita et al.

[11] Patent Number: 5,642,289
[45] Date of Patent: Jun. 24, 1997

[54] DRUM LEAD MEASURING METHOD AND APPARATUS CAPABLE OF PRECISELY EVALUATING LEAD SHAPE

[75] Inventors: Taketo Miyashita; Junichi Sakamoto, both of Kanagawa, Japan

[73] Assignee: Sony Corporation, Japan

[21] Appl. No.: 270,469

[22] Filed: Jul. 5, 1994

[30] Foreign Application Priority Data

Jul. 7, 1993 [JP] Japan .................... 5-192789

[51] Int. Cl.⁶ .................... G06F 15/00; H04N 7/18; G01B 11/24
[52] U.S. Cl. .................... 364/488; 356/376; 356/237; 348/126; 348/139; 324/662; 324/684; 360/85; 360/96.5; 360/95; 73/105
[58] Field of Search .................... 364/488, 489, 364/578, 474.37, 562, 474.09, 474.34, 560, 191, 559; 73/105; 324/61 R, 662, 684; 395/500, 5; 382/199, 145; 360/130.24, 84, 85, 95, 96.5, 63–66, 132–137; 356/376, 2, 237; 348/126, 139; 428/137, 156, 571, 573

[56] References Cited

U.S. PATENT DOCUMENTS

| | | | |
|---|---|---|---|
| 4,121,267 | 10/1978 | Hayashi | 360/85 |
| 4,560,924 | 12/1985 | Nordberg | 324/61 R |
| 4,665,739 | 5/1987 | Mizuno | 73/105 |
| 4,701,363 | 10/1987 | Barber | 428/137 |
| 4,706,360 | 11/1987 | Callens, Jr. et al. | 29/407 |
| 4,786,011 | 11/1988 | Fujiwara et al. | 360/84 |
| 4,933,788 | 6/1990 | Patel et al. | 360/85 |
| 5,137,362 | 8/1992 | LeBeau | 356/394 |
| 5,212,613 | 5/1993 | Seo | 360/130.24 |
| 5,347,363 | 9/1994 | Yamanaka | 356/376 |

FOREIGN PATENT DOCUMENTS

| | | |
|---|---|---|
| 2640741 | 6/1990 | France . |
| 61-23906 | 2/1986 | Japan . |
| 9012277 | 10/1990 | WIPO . |

OTHER PUBLICATIONS

Mictrotecnic, No. 3, Oct. 1982, Zurich CH pp. 57–61 "The New Hob Tester, Model PCD–50 HB" figures 11,18.

Technisches Messen TM, vol. 56, No. 1, Jan. 1989, Munchen De pp. 17–22, XP112472 Pfeifer et al. "Lageprofung An Freiformkurven Und—Flachen in Der Koordinatenmesstechnik" The whole document.

*Primary Examiner*—Kevin J. Teska
*Assistant Examiner*—Jacques Louis-Jacques
*Attorney, Agent, or Firm*—Ronald P. Kananen

[57] ABSTRACT

Any shape lead formed on various types of drum may be measured without employing an exclusively-used profiling plane by a lead shape measuring apparatus. The lead shape measuring apparatus includes a shape measuring unit for measuring the shape of a lead formed on a drum used in a VTR while a theoretical value suitable for this lead shape is selected based on the type of drum.

6 Claims, 10 Drawing Sheets

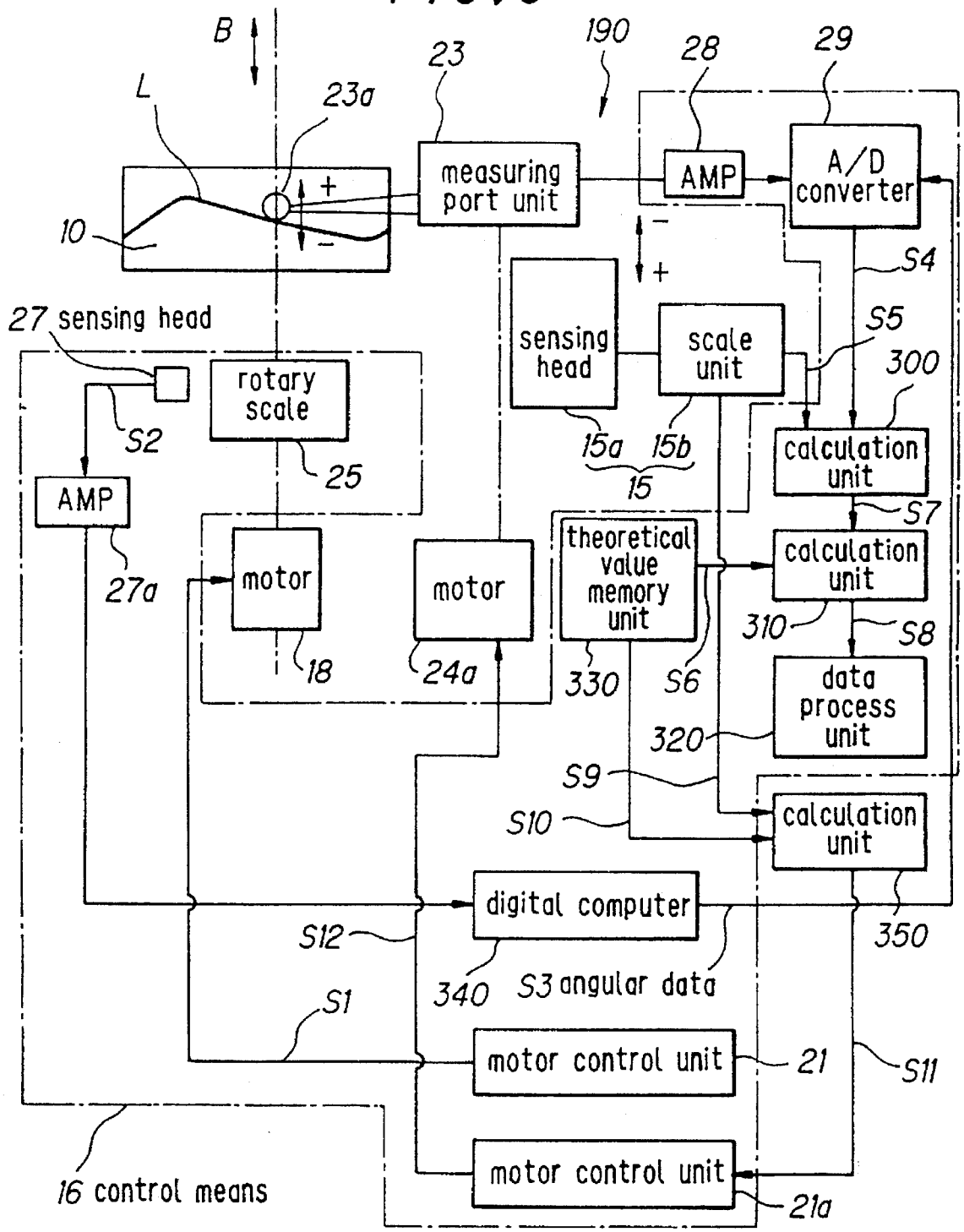

DRUM LEAD MEASURING METHOD AND APPARATUS CAPABLE OF PRECISELY EVALUATING LEAD SHAPE

BACKGROUND OF THE INVENTION

1. Field of the Invention

The present invention relates to a method and an apparatus for measuring a lead on a piece of apparatus, for example, a lead on a drum used to record a signal on a tape and/or to reproduce the signal from the tape.

2. Description of the Prior Art

Currently, approximately 100 different sorts of drums including drums used in consumer VTRs (video tape recorders) as well as non-consumer type VTRs, are available.

As to the drums, there has been proposed a lead measuring method for measuring the shape of the lead fabricated on the drum (e.g., the lower drum) on the basis of this drum per se, and also the lead measuring method for measuring the shape of the lead on the basis of the rotation shaft of the drum which has been assembled with respect to the rotation shaft of the drum. In addition thereto, the theoretical values for the variation amounts ($\pi \times$drum diameter "D"$\times$tan lead "$\theta$") of the respective lead shapes are different from each other with regard to 100 sorts of drums, so that the positions along the upper and lower direction would be changed.

Under such circumstances, every time the measuring method is changed and also the sort of drums to be measured is changed, the dedicated measuring machines must be specially manufactured in order to measure such different shapes of the leads formed on the drums.

There is another problem in case of manufacturing of such an dedicated measuring machine that this measuring machine should have either a dedicated copying (profiling) plane, or an exclusively-used copying (profiling) means. The copying plane, or means has a shape approximated to, for example, the theoretical value of the lead's shape.

SUMMARY OF THE INVENTION

The present invention has been made to in an attempt to solve the above-described problem, and therefore, has an object to provide a lead measuring method and a lead measuring apparatus capable of measuring shapes of different sorts of drums without employing a copying plane, or a profiling means.

Another object of the present invention is to provide a lead measuring method and a lead measuring apparatus capable of evaluating shapes of leads with high precision.

To achieve the above-explained objects, a drum lead measuring method according to one aspect of the present invention, is characterized by comprising the following steps:

A theoretical value of a shape of a lead is previously prepared;

a measuring port which is moved over a trace approximated to the theoretical value of the lead shape, is in contact with the lead to measure the shape of said lead, thereby obtaining an actual moving amount of said measuring port while said measuring port is traveled over the trace approximated to the theoretical value;

a difference between the actual moving amount of the measuring port and the trace approximated to the theoretical value of the shape of the lead is calculated; and only the shape of the lead is extracted based on said difference and said shape of the lead measured by said measuring port.

Further, to achieve the above-described objects, a drum lead measuring apparatus according to another aspect of the present invention, is characterized in that in a drum having a lead for guiding a tape, and used to record a signal on the tape and/or reproduce the signal from the tape, a shape measuring means for measuring a shape of said lead employed in accordance with the sort of said drum by varying information of a theoretical value related to the shape of said lead in accordance with the sort of said drum, is provided when the shape of said lead formed on said drum is measured.

Preferably, in accordance with the present invention, both the shape of the above-explained lead and the actual moving amount of the above-described measuring port are measured along a direction parallel to the central axis of the drum.

With the above-described arrangement, when the shape of the lead fabricated on the drum is measured, the shape measuring means may measure the shape of the lead, depending on the sort of drum, by varying the information of the theoretical value related to the lead shapes at the various angles, in correspondence with the sort of drum.

BRIEF DESCRIPTION OF THE DRAWINGS

A better understanding of the present invention will be had when reference is made to the following detailed descriptions taken in conjunction with the accompanying drawings, in which:

FIG. 4 is a plan view of a portion of drum supporting means shown in FIG. 3;

FIG. 5 is a schematic block diagram for representing a control system employed in the lead measuring apparatus of FIG. 3;

DETAILED DESCRIPTION OF THE PREFERRED EMBODIMENTS

Referring now to the accompanying drawings, a lead measuring method/apparatus according to a presently preferred embodiment of the present invention will be described in detail.

Although the technically preferred structure is disclosed in connection with the below-mentioned preferred embodiments, it is obvious that the present invention is not limited thereto, and may be modified, changed, and substituted without departing from the technical spirit and scope of the present invention.

Figure 1:
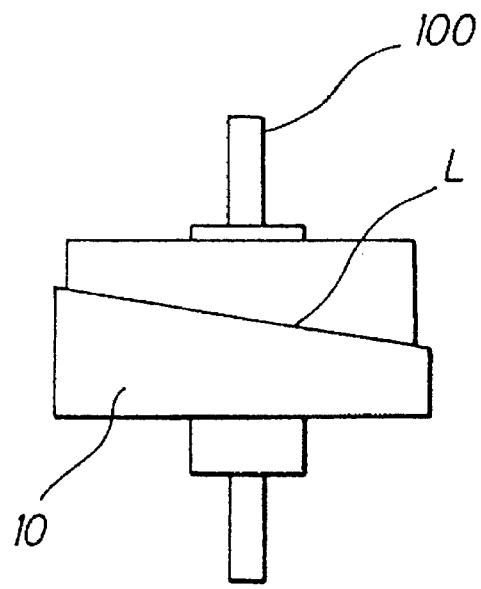
FIG. 1 is a front view of a shaft rotary type lower drum assembly to be measured by a lead measuring apparatus according to the present invention.
Figure 2:
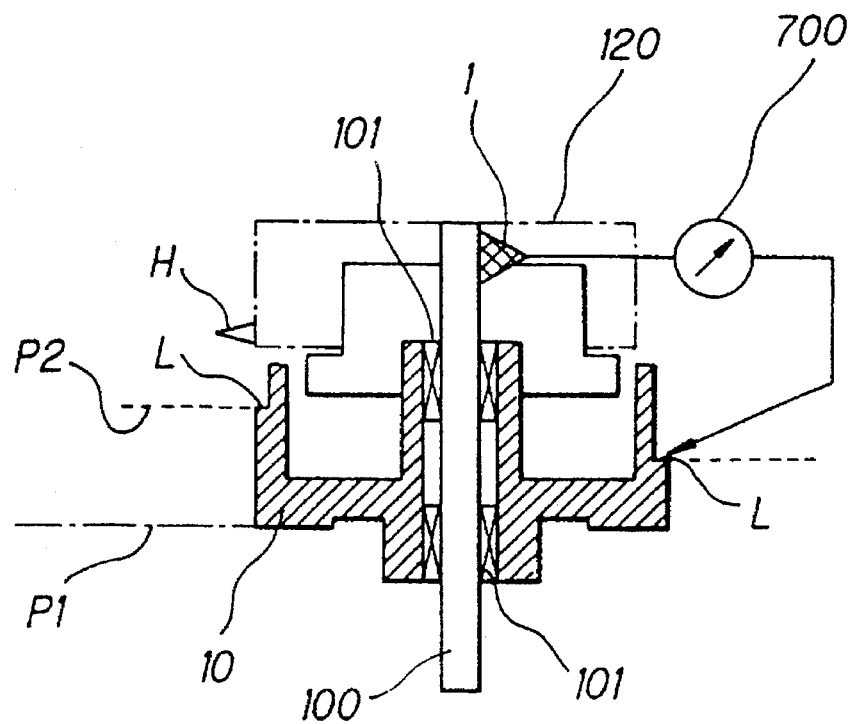
FIG. 2 is a sectional view of the lower drum shown in FIG. 1.

In FIGS. 1 and 2, a lower drum 10 functioning as one example of a work to be measured by a lead measuring apparatus (will be described later) according to the present invention is shown. This lower drum 10 will also be referred to a fixed drum, and corresponds to a lower drum assembly i.e., a shaft rotary type lower drum. In other words, the lower drum 10 is rotatably mounted on a shaft 100 by means of a bearing 101.

The lower drum 10 is provided with a lead "L". In FIG. 2, a reference plane of this lower drum is indicated by symbol P1, whereas a lead plane is denoted by symbol P2.

This lead "L" is formed on the lower drum 10 in order to guide a video tape.

As previously explained, this lower drum 10 corresponds to the shaft rotary type lower drum. A diameter of this shaft rotary type lower drum is selected to be, for example, 70 to 80 mm. Preferably, this lower drum 10 is such a drum applicable to, for example, a non-consumer type VTR. The lower drum 10 is utilized in combination with an upper drum 120 as indicated by a dot and dash line.

The upper drum 120 is mounted on the shaft 100. Either a single head, or a plurality of heads are mounted on this upper drum 120. With this head mounted on the upper drum 120, a signal may be recorded on, or reproduced from a video tape (not shown in detail) traveled along this lead "L".

Basically, the lead plane P2 of this lead "L" is measured by way of a lead measuring apparatus 700 with respect to the rotary shaft 100 of the lower drum 100.

Figure 3:
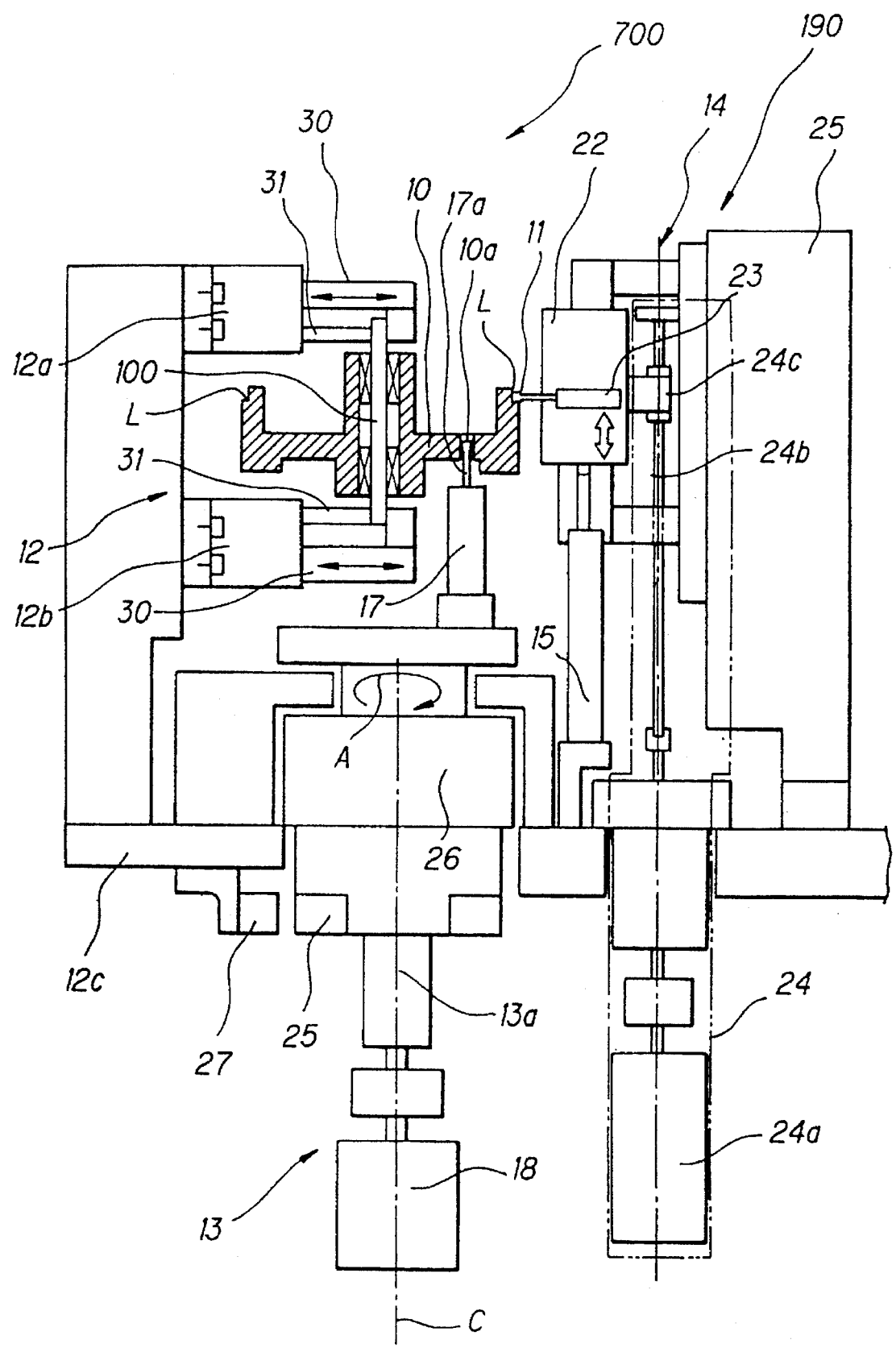
FIG. 3 schematically illustrates a construction of a lead measuring apparatus according to one preferred embodiment of the present invention.

Referring now to FIG. 3, a construction of a lead measuring apparatus 700 according to a presently preferred embodiment of the present invention will be described.

Preferably, this lead measuring apparatus 700 is of a general-purpose lead measuring type. That is, the lead measuring apparatus 700 can measure a shape of a lead formed on a selected sort of drum irrelevant to the sorts of drums.

The major measuring item of this lead measuring apparatus 700 is to measure the shape of the lead "L" indicated in FIG. 1 and FIG. 2, more specifically the linearity or wariness of this lead "L".

The lead measuring apparatus 700 includes a drum holding means 12 and a shape measuring means 190.

The shape measuring means 190 contains a so-called "Kelly" unit rotating means 13, a measuring portion sliding unit 14, a measuring port moving amount (displacement) detecting means 15, and control means 16 shown in FIG. 5.

A description will now be made of the drum holding means 12.

The drum holding means 12 is provided with an upper unit 12a and a lower unit 12b. Both of these upper and lower units 12a and 12b constitute a paired structure. The upper unit 12a has a moving member 30 and a fixed member 31. Similarly, the lower unit 12b has a moving member 30 and a fixed member 31.

This upper unit 12a is provided to secure the upper end of the rotary shaft 100. That is, as illustrated in FIG. 4. the upper end of the rotary shaft 100 is fixed between the moving member 30 and the fixed member 31 by displacing the moving member 30. Similarly, the lower end of the rotary shaft 100 is fixed between the moving member 30 and the fixed member 31 by displacing the moving member 30 of the lower unit 12b.

As a result, the rotary shaft 100 of the lower drum 10 can be detachably fixed by the drum holding means 12 in the vertical direction.

It should be noted that this drum holding means 12 is connected to a column 12c.

Next, a description will now be made of the Kelly unit rotating means 13 of the shape measuring means 190 indicated in FIG. 3.

The Kelly unit rotating means 13 includes a rotating member 13a, a motor 18, and a Kelly unit 17. This rotating member 13a is rotatable by the motor 18 around a central axis "C" direction indicated by "A".

The Kelly unit 17 is fixed on the upper surface of the rotating member 13a. An inserting member 17a provided on the upper end of this Kelly unit 17 may be inserted into a hole 10a. With the above-described construction, when the motor 18 is driven, the lower drum 10 may be rotated via the rotating member 13a and the Kelly unit 17 with respect to the axis "C" in the direction "A".

It should be noted that as illustrated in FIG. 5, the motor 18 can rotate the lower drum 10 at a predetermined rotational speed via the Kelly unit 17 and the like, in response to an instruction signal S1 issued from a motor control unit 21 of the control means 16 in synchronism with the lower drum 10.

Subsequently, the measuring port sliding unit 14 of the shape measuring means 190 will now be explained with reference to FIG. 3 and FIG. 4.

The measuring port sliding unit 14 is constructed of a precision slide 22, a measuring port unit 23, a slide driving unit 24 for upper and lower directions, and a column 25. The column supports the precision slide 22.

In FIG. 3, the slide driving unit 24 for upper and lower directions is arranged by a motor 24a, a ball screw 24b, and a slide coupling unit 24C. As a result, the drive force of the motor 24a is given via the ball screw 24b and the slide coupling unit 24c to the precision slide 22.

In other words, in response to an instruction value supplied from the motor control unit 21a, the precision slide 22 can be displaced in a direction parallel to the ball screw 24b along the upper and lower directions by driving the motor 24a. This precision slide 22 supports the measuring port unit 23.

The instruction value issued from the motor control unit 21a is such a theoretical value for forming a profile equivalent to the lead shape of the work (drum) to be measured. Furthermore, the position of the precision slide 22 is continuously measured by the moving amount detecting means 15.

As illustrated in FIG. 5, the measuring port unit 23 comprises, for instance, a micrometer. A contact 23a of this measuring port unit 23 is in contact with the plane of the lead "L". As especially shown in FIG. 5, this measuring port unit 23 is set in such a manner that the upper direction thereof corresponds to a positive direction of measurement, whereas the lower direction thereof corresponds to a negative direction of measurement.

This contact 23a is movable along the upper and lower directions with respect to the measuring port unit 23 within a very short range, for example, a range of ±10 μm. As a consequence, this contact 23a can detect a very small difference between the data pertaining to the actual lead shape and the theoretical value of the lead shape.

The moving amount detecting means 15 of the shape measuring means 190 will now be explained with reference to FIG. 3 and FIG. 5.

The moving amount detecting means 15 is provided with a sensing head 15a and a scale unit 15b. This moving amount detecting means 15 is a so-called "linear scale". Preferably, the moving amount detecting means 15 is made of a single-body (integral) type scale, so that these scale unit 14b and the sensing head 15a are stored within the same housing.

This sensing head 15a is constructed of such a type that, for example, laser light is projected to the scale unit 15b, and further the laser light reflected from this scale unit 15b is received by the sensing head 15a.

Next, a description will now be made of the control means 16 employed in the form measuring means 190, which controls the above-described various elements and is surrounded by a block shown in FIG. 5.

The measuring means 16 contains an amplifier 28, an A/D converter 29, calculation units 300 and 310, a theoretical value memory unit 330, and a data process unit 320. The measuring means 16 further includes a digital computer 340, a motor control unit 21 for rotating a main shaft, a motor control unit 21a for driving along upper/lower direction, an amplifier 27a, a sensing head 27, and a rotary scale 25.

First, the rotation system of the shape measuring means 190 will now be described. The rotary scale 25 employed in the rotation system of FIG. 5 is mounted on the rotary member 13a as illustrated in FIG. 3. The sensing head 27 is fixed on the side of the fixing unit located opposite to this rotary member 13a. While the rotary scale 25 is rotated, the sensing head 27 outputs a rotation signal S2. This rotation signal S2 is amplified by an amplifier 27a and then entered into the digital computer 340.

The digital computer 340 outputs a signal (angular data) S3 to the A/D converter 29. The sensing head 27 outputs an angular data signal as the rotation signal S2 per 1 degree of rotation. In response to this rotation signal S2, the measurement data derived from the measuring port unit 23 is amplified by the amplifier 28, and then converted by the A/D converter 29 into a corresponding digital signal.

That is, the A/D converter 29 A/D-converts the analog signal derived from the measuring port unit 23 into the digital signal S4 in response to the signal pertaining to the angular data supplied from the digital computer 340, and outputs this digital signal S4 to the calculation unit 300.

On the other hand, either an analog signal, or analog data S5 derived from the moving amount detecting means 15 is fetched by the calculation unit 300 together with the previously explained signal S4 from the A/D converter 29 at the same time. As a result, the calculation unit 300 outputs a signal S7 to the calculation unit 310.

This calculation unit 310 fetches a theoretical value signal S6 related to the theoretical value stored in the theoretical value memory unit 330.

Then, the calculation unit 310 fetches this theoretical signal S6 together with the signal S7 derived from the calculation unit 300. This theoretical value implies that this theoretical value corresponds to the theoretical values concerning the shapes of the leads at the respective angles, is equal to the theoretical value for the shape of the lead "L", or the profile of this lead shape formed on the lower drum 10, and has been previously stored in the theoretical value memory unit 330.

Referring now to FIG. 3 and FIG. 5, a method for measuring the shape of the lead "L" formed on the fixed drum 10 will be explained.

Figure 6:
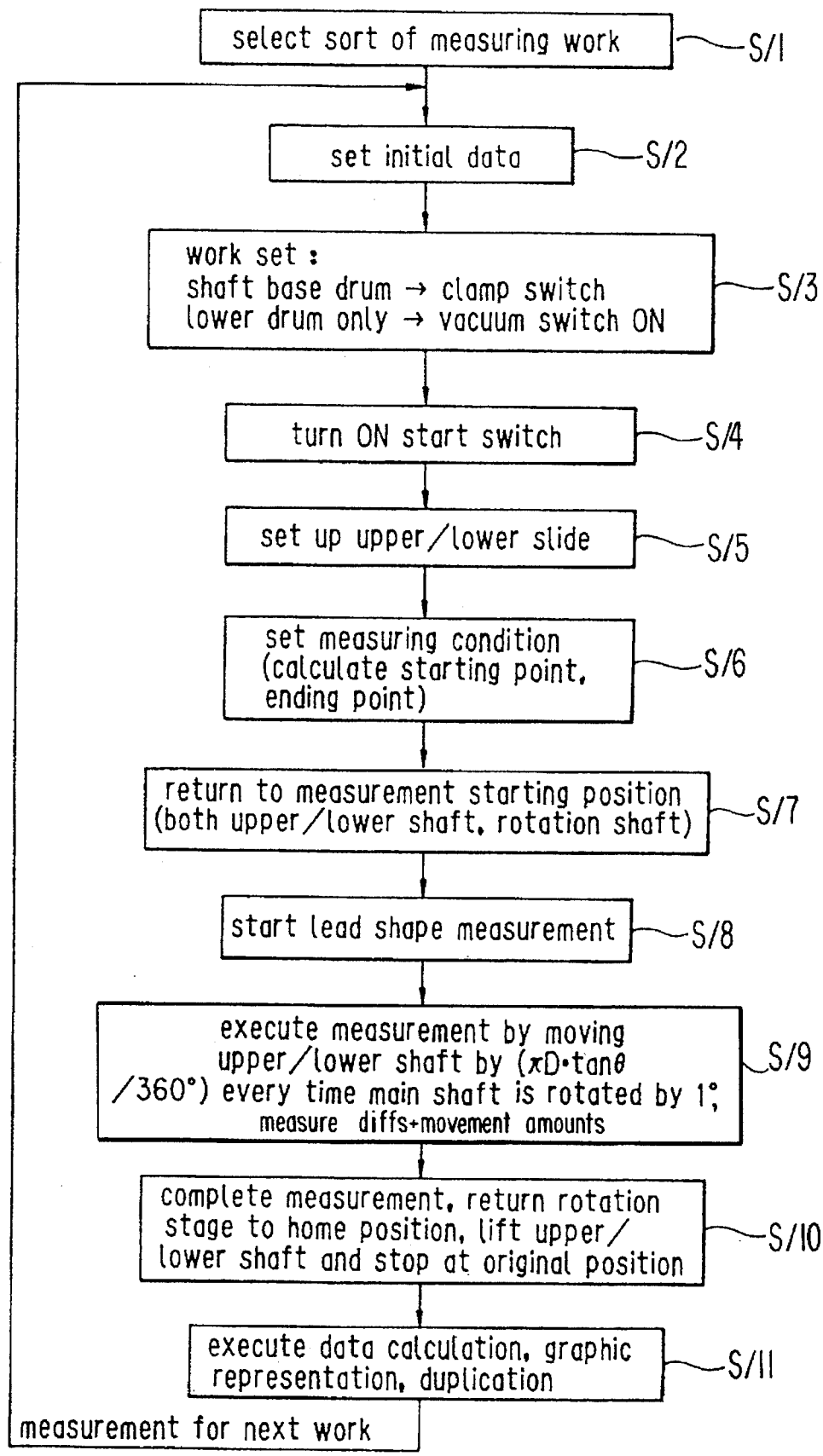
FIG. 6 is a flow chart depicting a method of measuring a shape of a lead.

It should be noted that a flow chart for explaining this method to measure the shape of the lead "L" is represented in FIG. 6.

At a first step S/1 of the flow chart shown in FIG. 6, the sort of fixed drum 10 corresponding to the work to be measured is selected by utilizing the digital computer 340 (work sort selection).

As a result, based upon the diameter of the drum, the lead angle, and the winding angle, which have been previously stored in the theoretical value memory unit 330, the computer 340 calculates various items such as the rotation starting angle of the major shaft spindle 26, the rotation ending angle thereof, and the slide moving amounts along upper/lower direction of the precision slide 22, and also 1-degree rotation of the major shaft. In this manner, the initial data may be set (step S/2).

As represented in FIG. 3 and FIG. 4, the upper end and the lower end of the rotary shaft 100 are set to the fixing member 31 having a V-shape under condition that the respective moving members 30 of the upper unit 12a and the lower unit 12b of the drum holding means 12 are open. Then, the moving member 30 is moved by a means (not shown), so that the upper end and the lower end of the rotary axis 100 are fixed between the moving member 30 and the fixed member 31 (step S/3).

Figure 11:
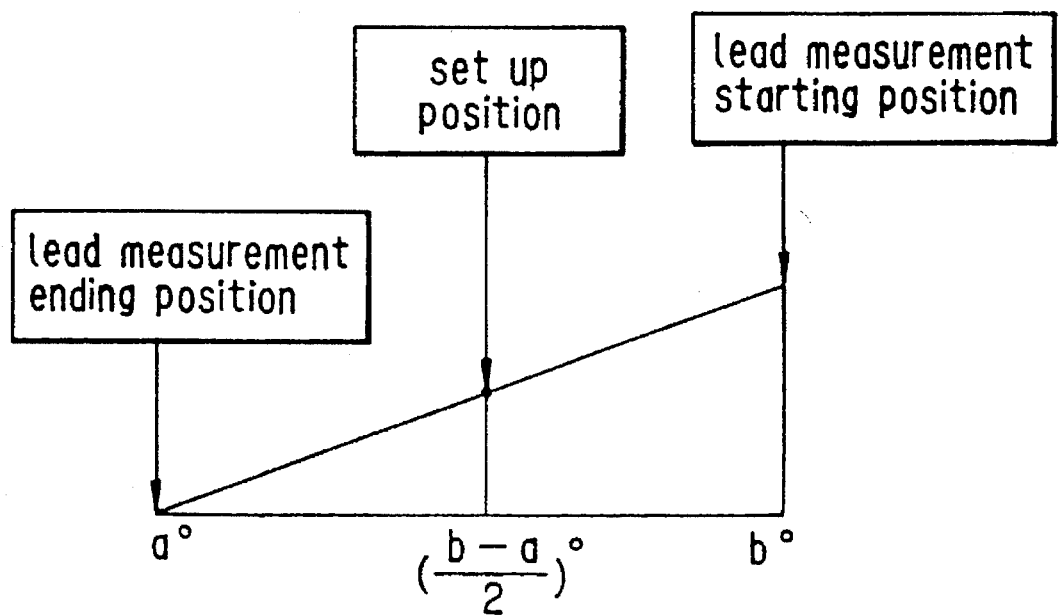
FIG. 11 schematically shows a series of operations which occur from the commencement of the lead shape measurement until the completion of the lead shape measurement.

It should be noted that when the work is set, a clamp switch is turned ON in case of the shaft reference drum, whereas a vacuum switch is turned ON in case of a single lower drum. Subsequently, the start switch is turned ON (step S/4), so that the precision slide 22 is induced to slide along the upper/lower (vertical) direction, and the set-up operation (step S/5) is performed at the step-up position as shown in FIG. 11, and then the measurement conditions (starting point, ending point etc.) are calculated (step S/6).

For instance, the position of the upper/lower direction sliding precision slide 22 is measured at the central position of the tape winding angle of the lead "L" (previously determined).

More specifically, when the precision slide 22 descends and the measuring port unit 23 is in contact with the work, the output from the amplifier 28 shown in FIG. 5 becomes zero, and in accordance with the present invention the precision slide 22 is read as the set-up position (See FIG. 11) by the scale unit 15b via the sensing head 15a.

The starting position along the upper/lower direction at the lead measurement starting position is calculated under such a condition that the read value of this step up position is employed as the reference value, and thereafter the precision slide 22 is moved. FIG. 11 shows the above-explained lead measurement starting position, lead measurement ending position, and central step-up positions thereof.

Then, both of the upper/lower shaft (upper/lower direction) of the precision slide 22 and the rotation shaft (rotation direction) of the drum 10 are returned to the lead measurement starting positions as shown in FIG. 11 (step S/7).

Next, the lead measurement is commenced (step S/8).

In response to the instruction signal S1 issued from the motor control unit 21 shown in FIG. 5, when the motor 18 starts its rotation, the fixed drum 10 is rotated by means of the Kelly unit 17 along the arrow direction "A" in synchronism with the rotation of this motor 18, as represented in FIG. 3. Since the rotation angle of the fixed drum 10 is varied, depending upon the shapes of this fixed drum 10, for instance, this fixed drum 10 is rotated by the tape winding angle, so that either the shape, or the profile of the lead "L" formed on the fixed drum 10 with respect to the rotation shaft 100 will be measured by the measuring port unit 23. It should be understood that the fixed drum 10 may be rotated along the arrow direction "A", but also may be swung along this arrow direction "A" and also an opposite direction thereof in order to measure a shape, or a profile of a lead.

Figure 10:
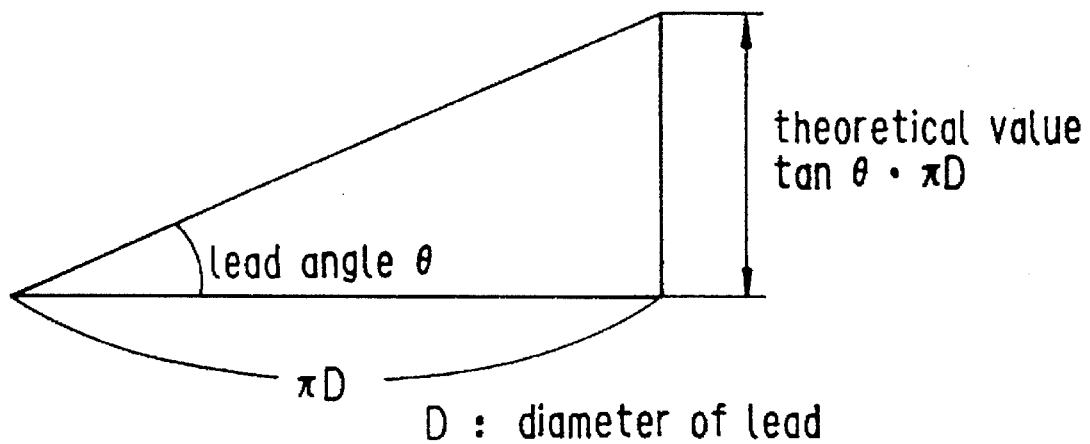
FIG. 10 is an illustration used to explain the theoretical value of the lead shape.

In an actual measurement, for instance, the precision slide 22 corresponding to the upper/lower shaft is transported by $\pi D \times \tan \theta/360°$ to carry out the measurement each time the major shaft (rotation shaft 100) is rotated by 1°, referring to FIG. 10 in which the theoretical value of the lead shape is described (step S/9). Note that symbol D denotes a diameter of a lead and symbol $\theta$ represents a lead angle.

In response to the above-described rotation of this fixed drum 10, the measuring port unit 23 is moved by the instructed value defined by the theoretical value stored in the theoretical value memory unit 330 shown in FIG. 5 in synchronism with the rotation of the major shaft. As a result, the measuring port unit 23 is transported in the direction "B" as shown in FIG. 5 (namely, vertically as viewed in FIG. 5). In other words, assuming now that the contact 23a of the measuring port unit 23 is moved in accordance with the theoretical value, this measuring port unit 23 is transported in the direction "B" in order to respond to the substantially ideal shape, or profile of the lead "L".

At this time, a calculation is executed in the calculation unit 350 based on the data S10 stored in the theoretical value memory unit 330 and the scale data S9 obtained after the measuring port unit 23 has been actually transported. If there is a difference between the theoretical value and the actually measured value, then the addition/subtraction calculations are performed with respect to a value for the subsequent target operation value, thereby obtaining a new instruction value S11.

Based upon this instruction value S11, a new target value is instructed to the motor control unit 21a. Furthermore, in response to an instruction value S12, the motor 23a is operated. A series of these operations is repeated within the lead measurement range.

In conjunction with the transport of this measuring port unit 23, the sensing head 15a of the moving amount detecting means 15 is similarly moved. Assuming now that the measuring port unit 23 is moved in a positive direction, the sensing head 15a of the moving amount detecting means 15 is moved in a negative direction. Conversely, when the measuring port unit 23 is moved in the negative directions, the sensing head 15a of the moving amount detecting means 15 is transported in the positive direction. That is, both of these unit 23 and head 15a are moved in a reverse manner in view of the numeric values.

When the measuring port unit 23 reaches the lead measurement ending position shown in FIG. 11 to complete the lead measurement, the fixed drum 10 present at the rotation stage is returned to the home position, and the precision slide 22 along the upper/lower shaft direction is lifted up until it reaches the original position thereof (step S/10).

Thereafter, the data calculation process is carried out and is represented as a graphic representation, and also this graph is duplicated by the data processing unit 320 (step S/11).

Figure 7:
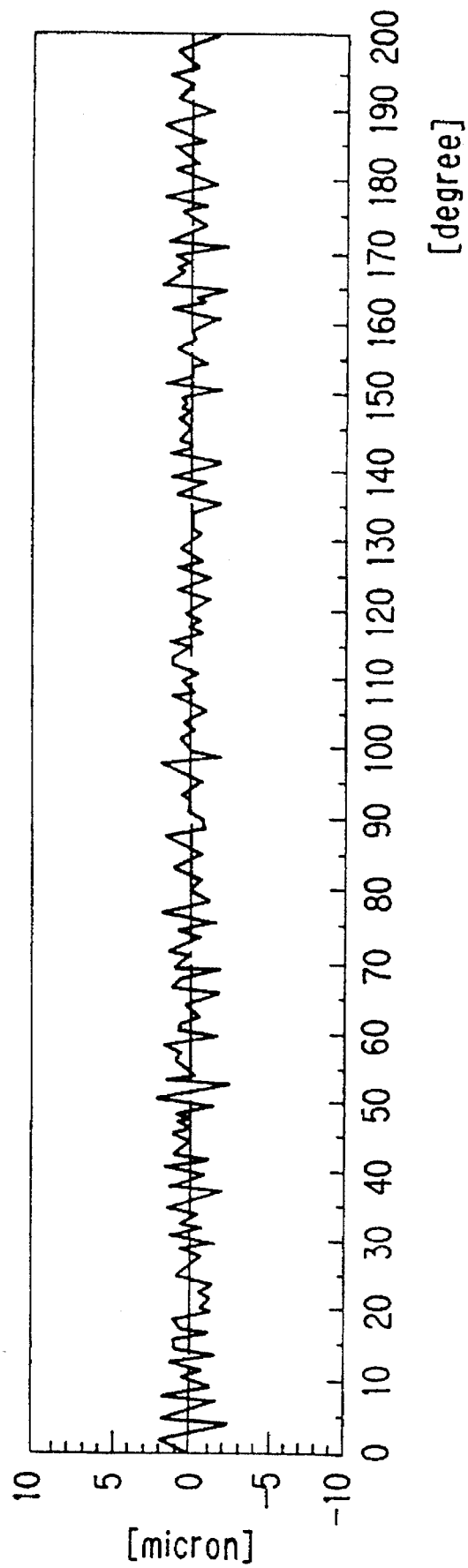
FIG. 7 is a graphic representation indicating the differences between the theoretical values and the data detected by the moving amount (viz., displacement) detecting means.
Figure 8:
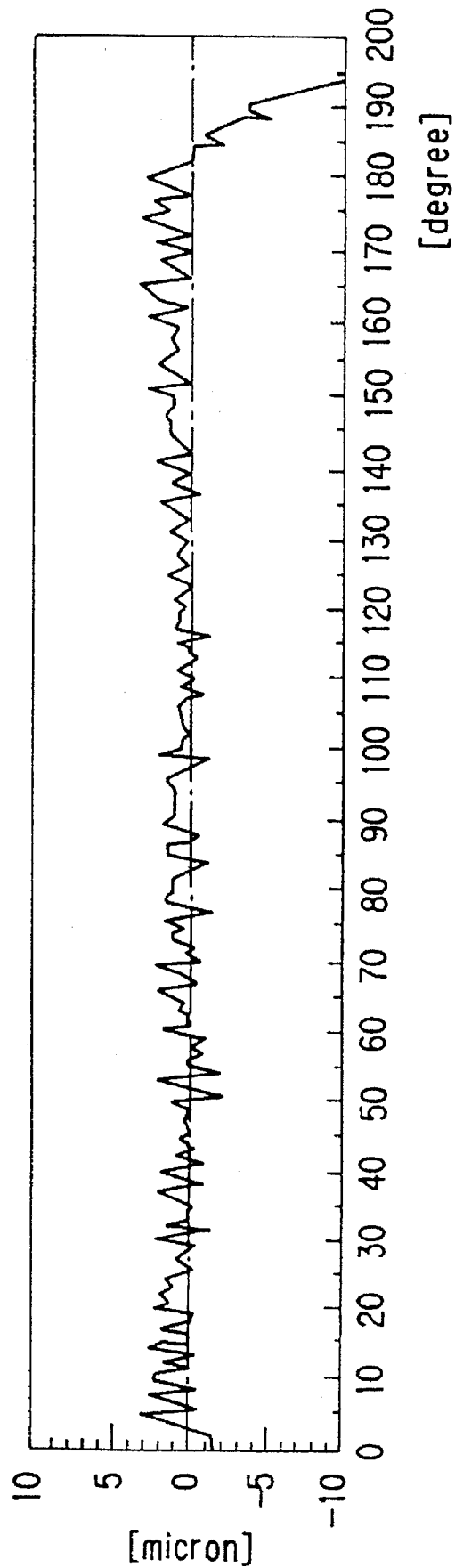
FIG. 8 is a graphic representation showing data actually measured by the measuring portion unit.
Figure 9:
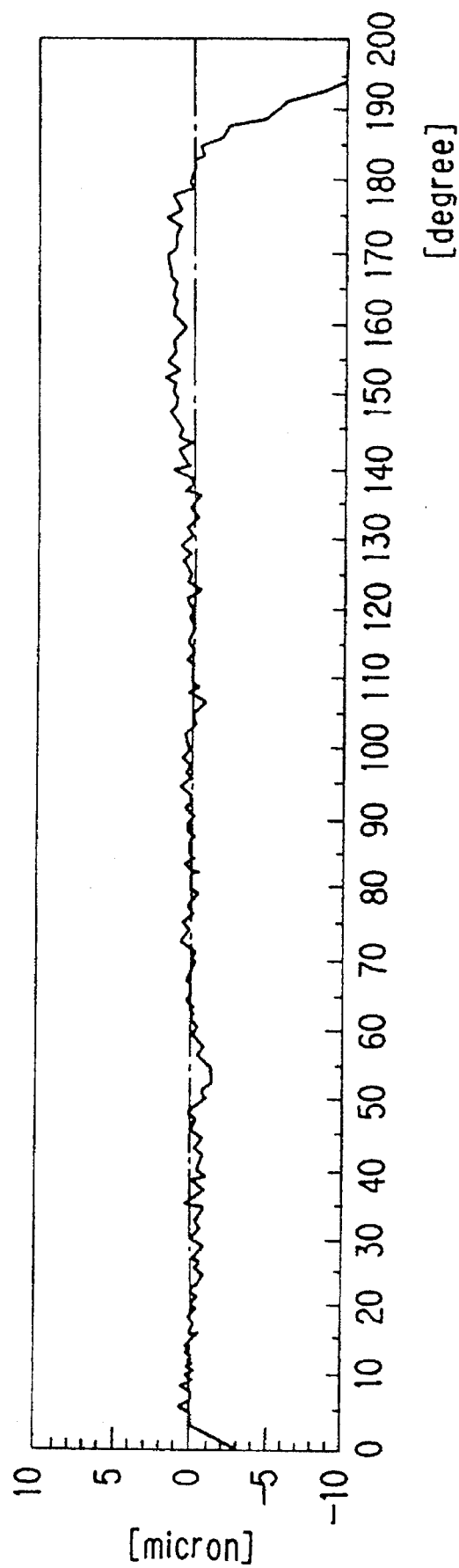
FIG. 9 is a graphic representation indicating the calculated data, i.e., the data exclusively pertaining to the lead shape.

One example of the measurement data obtained by carrying out a series of the above-explained measuring operations is graphically represented in FIG. 7 through FIG. 9. These graphic representations indicate a relationship between the rotation angle (in unit of degree) and the moving distance (in unit of micrometer).

First, FIG. 7 graphically shows difference data plotted by the respective angles, between the data signal S6 derived from the theoretical value memory unit 330 and the actually measured data S5 related to the movements of the measuring port unit 23, which is supplied from the moving amount detecting means 15 shown in FIG. 15.

FIG. 8 graphically shows the actually measured data of the signal S4 relating to the movements of the contact 23a employed in the measuring port unit 23. The actually measured data shown in FIG. 8 corresponds to the data produced from the difference data shown in FIG. 7, wherein negative symbols have been inverted, and also to the data to which the shape data of the lead "L" has been mixed. It should be noted that when the lead shape is measured by the contact 23a, this contact 23a is moved upwardly and downwardly within, for instance, a range between ±10 μm with respect to the measuring port unit 23 in accordance with the actual lead shape.

FIG. 9 graphically indicates the data S8 which has been calculated in the calculation unit 310, namely indicates the data which relates solely to the shape of this lead "L".

As previously explained, the data shown in FIG. 8 represent such data arranged by considering both the data produced from the difference data of FIG. 7, whose negative symbols have been inverted, and the data representative of the lead shape.

As a consequence, when the data of FIG. 7 are added to the data of FIG. 8, the difference data between the theoretical value and the actually measured value is negated, resulting in the data shown in FIG. 9. In other words, the data containing only the shape of this lead "L" remains in FIG. 9.

As described above, in accordance with this preferred embodiment, only the shape of the lead "L" formed on the rotary shaft type fixed drum can be measured.

A description will now be made of another measurement for a shape of a lead formed on a fixed shaft type drum according to another preferred embodiment of the present invention.

Figure 12:
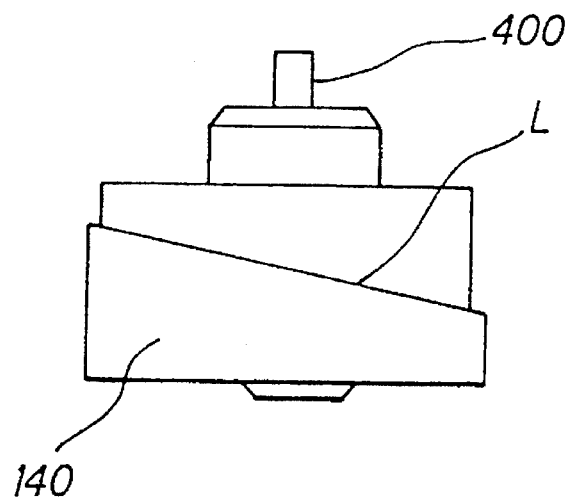
FIG. 12 is a side view for showing an assembly of a shaft fixing type lower drum to be measured by the lead measuring apparatus of the present invention.
Figure 13:
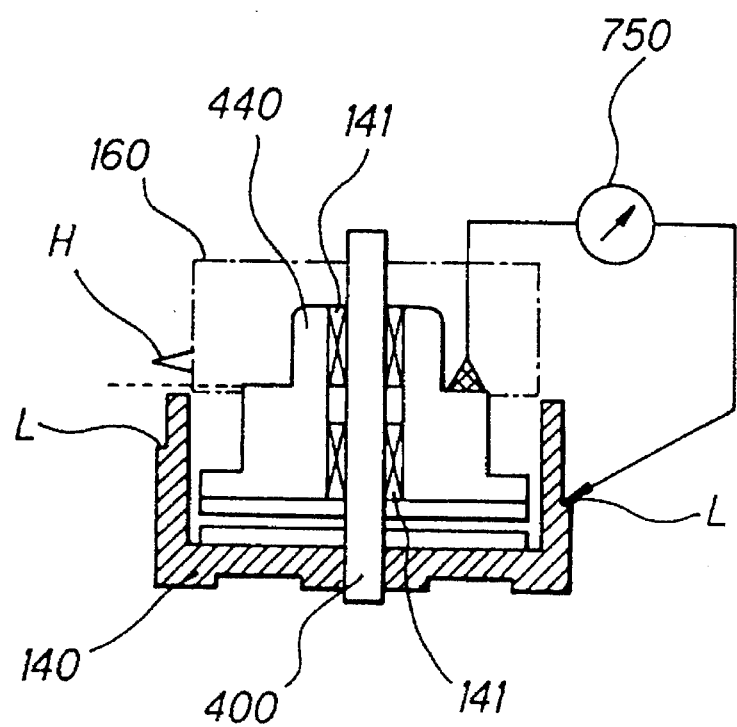
FIG. 13 is a sectional view of the lower drum shown in FIG. 12.

In FIG. 12 and FIG. 13, there is shown an assembly of a fixed shaft type lower drum 140. The lower drum 140 is fixed to the lower end of the shaft 400. A flange 440 is rotatably connected to this shaft 400 via a bearing 141. With respect to this flange 440, the upper drum 160 may be set. Either one head, or plural heads "HI" are set on this upper drum 160.

In this embodiment, the shape of the lead "L" formed on the lower drum 140 is measured by a lead measuring apparatus 750 on the basis of the flange 440 rotatably connected to the rotation shaft 400.

Figure 14:
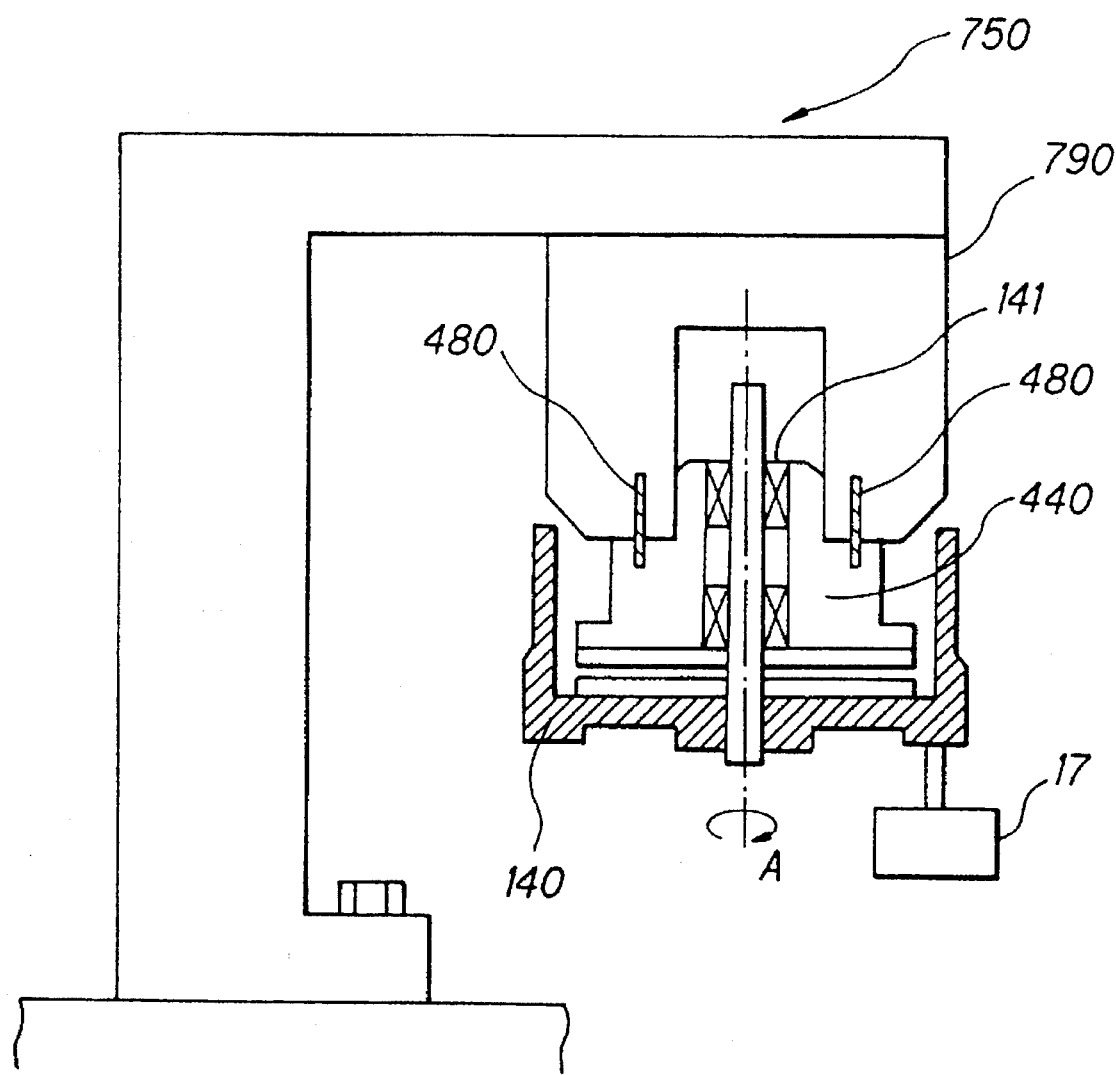
FIG. 14 schematically indicates a lead measuring apparatus, according to another preferred embodiment of the present invention, for measuring the lead formed on the lower drum shown in FIG. 13.

As illustrated in FIG. 14, the flange 440 is fixed to a fixing portion 790 of the lead measuring apparatus 750 by way of, for example, a screw 480. Thereafter, similar to the previous embodiment shown in FIG. 3, the fixed drum 140 is geared with the Kelly unit 17, and this fixed drum 140 may be rotated along the arrow direction "A" by rotating a rotation member (not shown). The shape measuring means includes a Kelly unit rotating means, a measuring port sliding unit, a moving amount detecting means for a measuring port, and a control means similar to the previous embodiment. The operations of these units are the same as in the previous embodiment of FIG. 3, and therefore no further explanations thereof will be made in the following description.

As previously described in detail, in accordance with the lead shape measuring apparatus of the present invention, the shape of any type of lead formed on the various types of drums can be measured without employing either the exclusively-used profiling (copying) plane, or the exclusively-used profiling means, and therefore the shapes of the leads can be evaluated with high precision. In other words, according to the present invention, the lead shapes of various sorts of drums can be measured as the general purpose lead measuring apparatus without employment of such a mechanically precise guide means as a profiling plane of a upper/lower shaft, since the theoretical values for the variation amounts are previously stored.

Since the shape of the lead is measured by the lead shape measuring apparatus of the present invention while the drum mounting unit for the drum rotation shaft is used as the reference, the measured data is not influenced by the drum inclination with respect to the rotation shaft, so that the real lead shape can be precisely evaluated. As a result, the precision error between the lead and the rotation shaft perpendicular to the head (namely, linearity of the lead with regard to the head) can be minimized. Consequently, the lead shape can be evaluated in high precision.

What is claimed is:

1. A drum lead measuring method comprising:
   moving a measuring port along a trace which approximates a theoretical shape of the lead;
   using a contact which is movable with respect to the measuring port and which physically contacts the lead to measure positional differences between the measuring port and the lead;
   obtaining an actual moving amount of the measuring port as the measuring port travels over the trace;
   calculating a difference between the actual moving amount of the measuring port and the positional differences between the measuring port and the lead; and
   extracting the shape of the lead based on said difference.

2. A drum lead measuring method as claimed in claim 1, wherein the drum has a central shaft, and wherein both the shape of the lead and the actual moving amount of the measuring port are measured in a direction parallel to the central shaft of the drum.

3. A drum measuring apparatus for a drum which has a lead for guiding a tape, and which is used to record a signal on the tape or reproduce the signal from the tape, comprising: micrometer means having a contact which physically contacts the lead; and
   a shape measuring means operatively associated with said micrometer means for measuring a shape of said lead employed in accordance with said drum by varying a theoretical value related to the shape of said lead.

4. A drum lead measuring apparatus comprising:
   means for moving a measuring port along a trace which approximates a theoretical shape of the lead;
   contact means which is movable with respect to the measuring port and which physically contacts the lead for measuring positional differences between the measuring port and the lead;
   means for obtaining an actual moving amount of the measuring port as the measuring port travels over the trace;
   means for measuring a difference between the actual moving amount of the measuring port and the positional differences between the measuring port and the lead; and
   means for extracting the shape of the lead based on said difference.

5. A drum lead measuring method comprising:
   a) moving a measuring port to a first port position with respect to a lead of a drum under inspection in accordance with pre-recorded data;
   b) moving a contact of the measuring port to a first contact position wherein the contact establishes physical contact with the surface of the lead;
   c) determining a first difference between the first port position and the first contact position assumed by the contact when the contact contacts the surface of the lead;
   d) rotating the body on which the lead is formed by a predetermined increment;
   e) moving the measuring port to a second position determined using the pre-recorded data and the first difference between the first port position and the first contact position;
   f) measuring the amount movement of the measuring port as the measuring port moves from said first position to said second position;
   g) moving the contact of the measuring port into physical contact with the surface of the lead;
   h) determining a second difference between the second position of the measuring port and a second position assumed by the contact when the contact contacts the surface of the lead;
   i) rotating the body on which the lead is formed by the predetermined increment;
   j) moving the measuring port to a third position determined using the pre-recorded data and the second difference between the second position of the measuring port and a position of the contact;
   k) measuring the amount of movement of the measuring port as the measuring port moves from said second position to said third position;
   l) repeating the steps of b) to k) n times; and
   determining the shape of the lead by mathematically processing the differences and the amounts by which the measuring port is moved.

6. A drum lead measuring apparatus comprising:
   means for moving a measuring port to a plurality of positions in accordance with prerecorded data;
   means for moving a contact associated with the measuring port into physical contact with a surface under measurement;
   means for:
      measuring the distance moved by the contact with respect to the measuring port,
      adjusting each subsequent movement of the measuring port with respect to the distance moved by the contact,
      measuring the amount of movement of said measuring port between each of the plurality of position, and
      extracting a shape from the distances moved by said contact and the amounts of movement of said measuring port.

* * * * *